United States Patent [19]

Wirtz

[11] Patent Number: 5,730,468

[45] Date of Patent: Mar. 24, 1998

[54] METHOD FOR THE DYNAMIC VERIFICATION OF AN AUTOGRAPH CHARACTER STRING ON THE BASIS OF A REFERENCE AUTOGRAPH CHARACTER STRING

[75] Inventor: Brigitte Wirtz, Holzkirchen, Germany

[73] Assignee: Siemens Aktiengesellschaft, Munich, Germany

[21] Appl. No.: 625,750

[22] Filed: Mar. 29, 1996

[30] Foreign Application Priority Data

Mar. 29, 1995 [DE] Germany ............ 195 11 472.8

[51] Int. Cl.$^6$ ............................................. B42D 15/00
[52] U.S. Cl. ............................. 283/70; 283/67; 283/45
[58] Field of Search .................... 283/45, 67, 68, 283/70, 46, 69, 57, 117; 382/119, 120, 121, 122, 123

[56] References Cited

U.S. PATENT DOCUMENTS

| 2,198,802 | 4/1940 | Brady ................... 283/68 X |
| 3,718,908 | 2/1973 | Bloomstein ............. 283/70 X |
| 4,433,436 | 2/1984 | Carnes .................. 382/123 |
| 5,237,394 | 8/1993 | Eaton ................... 283/70 X |
| 5,537,486 | 7/1996 | Stratigos et al. ....... 283/70 X |
| 5,587,560 | 12/1996 | Crooks et al. ......... 382/119 X |

FOREIGN PATENT DOCUMENTS 28 55 863 12/1979 Germany.
38 22 671 C2 11/1990 Germany.

OTHER PUBLICATIONS

Automatic Signature Verification and Writer Identification–The State of the Art–Plamondon et al—pp. 107-131–Pattern Recognition, vol. 22, No. 2, pp. 107-131 1989.

Online Signature Verification Based on Shape, Motion, and Writing Pressure–Sato et al—pp. 823–826, 1982 IEEE.

The Use of a One–Stage Dynamic Programming Algorith for Connected Word Recognition–Hermann Ney—1984 IEEE.

IEICE ransactions, vol. E74, No. 7 Jul. 1991—On–line Signature Verification Incorporating the Direction of Pen Movement—Yoshimura pp. 2083–2092.

*Primary Examiner*—Willmon Fridie, Jr.
*Attorney, Agent, or Firm*—Hill, Steadman & Simpson

[57] ABSTRACT

In a method for dynamic verification of an autograph character string on the basis of a reference autograph character string, the principle of dynamic programming is used for signature verification. Digitized handwriting data as functions of time are first normalized by a standard method. The verification works according to the invention with structural units of the signature, so-called strokes, which result from the writing motions with a raised or, respectively, lowered stylus. The particular concept is to base the dynamic programming on a cost function that combines several handwriting data. The stable structural portions of the signature are more strongly weighted in the method than unstable ones. This leads to a higher verification performance than in standard methods. The method also enables the comparison of signals having different numbers of strokes, so that omissions or additional strokes can be correctly evaluated, by predetermining syntactic rules for their treatment.

16 Claims, 2 Drawing Sheets

METHOD FOR THE DYNAMIC VERIFICATION OF AN AUTOGRAPH CHARACTER STRING ON THE BASIS OF A REFERENCE AUTOGRAPH CHARACTER STRING

BACKGROUND OF THE INVENTION

Identity and authentification methods are an important area in the field of security technology. Alongside technologies such as password or smart card methods, so-called biometric methods are also used. Instead of checking knowledge or information possessed by the user, here the user is identified by the detection of physiological or behavioral characteristics that are unique to him. Signature verification is one such biometric method, in which the user identifies himself by means of his signature. Particularly in dynamic signature verification, it is assumed that the dynamic characteristics are specific to the signer, sufficiently stable and repeatable, and impossible or difficult for a forger to reproduce.

The handwritten character string as a means for automatic personal identification has considerable advantages. It is probably the most widespread technology in the alphabetized field. The signature is an "ID code" that is unique to its owner throughout life, can be reproduced at any time, and will not be forgotten.

R. Plamondon, G. Lorette, Automatic Signature Verification And Writer Identification—State Of the Art, Pattern Recognition, Vol. 22, No. 2, 1989, pp. 107–131, gives an overview of the state of the art and the literature on signature verification and writer identification.

A system for signature verification processes the produced character string independently of the textual content, with the goal of confirming or rejecting the identity of the writer. For this purpose, each signature produced is compared with the corresponding reference signature or signatures. An identity number thereby serves e.g. for the identification or, respectively, selection of the necessary references.

Theoretically, the problem of signature verification is a simple pattern recognition problem for distinguishing between two classes, that of the originals and that of the forgeries. However, the signing process does not always yield identical signatures, either with respect to the static or to the dynamic characteristics. Even if there is sufficient stability for the verification process, a certain variability in the writer's way of writing is still present. This is expressed in the form of geometric disturbances such as translation, rotation and even absence of segments of the signature. One can only say that if a character string is an identical copy of a reference, it must certainly be a forgery.

On-line systems for handwriting verification require a device with which the temporal sequence of stylus positions, and possibly also other signals such as speed, acceleration or stylus motions, can be recorded during the writing process and thus brought to bear in verification.

Dynamic time warping is known from the literature as a comparison method—See Hermann Ney, The Use of a One-Stage Dynamic Programming Algorithm for Connected Word Recognition, IEEE Transactions on Accoustics, Speech, and Signal Processing, Vol. ASSP-32, NO. 2, April 84, pp. 263–271.

The problem of non-linear time normalization (compression of the signal in some time sections, stretching in others) arises equally in the recognition of spoken words or the recognition of echocardiograms in the medical field.

A known approach to solving the problem in those areas is dynamic time warping, comprising the non-linear correlation of two time signals by means of dynamic programming (DP). This method can also be applied to the comparison of signature signals. The transformation consists of the local stretching or, respectively, flattening of the time axis of one signal relative to that of the other. By means of local adjustments, DP thereby determines the best mapping, in the sense of the greatest similarity between the reference and the test signal in relation to the selected features (position, force, pressure, speed, etc.). Advantages of DP include its stability against local disturbances, the guarantee of an optimal solution, and the facts that the statistical characteristics of the signals do not have to be known and that it has no critical parameters. The principle of dynamic programming has the advantage that as a result the distortion function describes the similarity of the form, as well as that of the dynamic, of the selected signal to the reference.

SUMMARY OF THE INVENTION

It is an object of the invention to indicate an improved method for the verification of an autograph character string on the basis of a reference sample of this autograph character string.

According to a method of the invention for dynamic verification of an autograph character string based on a reference autograph character string, during handwriting of the autograph character string and the reference autograph character string with a stylus, acquiring and retaining characteristic motion parameters that describe stylus motion. Based on the motion parameters, and in dependence on whether or not the stylus is pressed against a writing surface, decomposing each of the autograph character string and the reference autograph character string into at least a first and a second partial character string in the form of a first and second stroke. Normalizing the motion parameters of the reference character string and of the autograph character string. Applying at least one predefined rule, which determines allocation and/or evaluation of strokes to be compared, to the autograph character string and to the reference character string. The strokes of the autograph character string are compared with allocated strokes of the reference character string by dynamic programming, whereby during calculation of a minimal distance between respective strokes, a combination of at least two normalized motion parameters is selected, of which a first describes at least the stylus position in dependence on time, so that, strokewise, a verification measure is obtained that indicates similarity of the autograph character string to the reference character string.

An important advantage of this method according to the invention is that in comparison with the prior art, more features of the reference character string and of the character string to be recognized are exploited. Thus, the stroke information, i.e. the information concerning the guiding of the stylus over the writing surface and in its lifted-off state, which divides the signature into segments, is advantageously incorporated into the method. In this way an improved allocation of the locus dependencies in the signatures to be compared can be carried out. Advantageously, this fact is taken into account in the invention by choosing a cost function for the distance calculation of the dynamic programming in such a way that this function combines locus parameters and, for example, pressure and speed parameters. The warp function, i.e. the distortion function, generated by the dynamic programming can thus be forced into the interval boundaries predetermined by the individual strokes.

Advantageously, the factors combined in the cost function can be weighted with other factors in order to take into account the effects of the individual motion parameters on the writing process.

Advantageously, in the method according to the invention the pressure used in writing is selected as one of the motion parameters. In this way the stroke information can be obtained via the pressure information.

Preferably, in the method according to the invention the writing speed is selected as a parameter of the cost function for the dynamic programming, since in this way the person-specific motor characteristic in the writing process can be taken into account particularly well.

Preferably, in the method according to the invention the reference character string is prepared in a particular way. The weighting of the individual strokes contained in the reference character string according to their accuracy of reproduction in a set of sample signatures enables the additional weighting of determined characteristic features of a character string according to their significance and their reproducibility, so that an existing reference character string can count as particularly representative.

Preferably, in the method according to the invention a single reference character string is chosen from a set of sample character strings as particularly advantageous, which character string comprises the smallest differences, with respect to the set of motion parameters to be verified, to the rest of the sample character strings produced as references. Advantageously, the formation of mean values in the selection of the suitable reference character string from the sample set of reference character strings can be carried out in different ways. For example, the reproducibility of a character string can be better taken into account via the mean value of the respective verification measure, or via the writing duration, i.e. via the standard deviation thereof.

It is particularly advantageous that in the method according to the invention character strings that do not agree in number of strokes with the reference character string are not immediately classified as faulty; rather, determined procedural rules are applied in order to test whether this character string can be brought into agreement with the reference character string through dynamic programming.

Advantageously, in the method according to the invention different procedures are applied for superfluous or missing strokes in the character strings to be verified, and a superfluous stroke is, for example, penalized according to the relation of its length to the overall length of the character string. The method according to the invention can be realized in a particularly simple and thus less computing-intensive manner by, for example, taking shape and motion factors acquired during reference formation into account and forming weighting factors therefrom by means of mean values and the standard deviations.

In the following the invention is further specified on the basis of the drawing figures.

DESCRIPTION OF THE PREFERRED EMBODIMENTS

Figure 1:
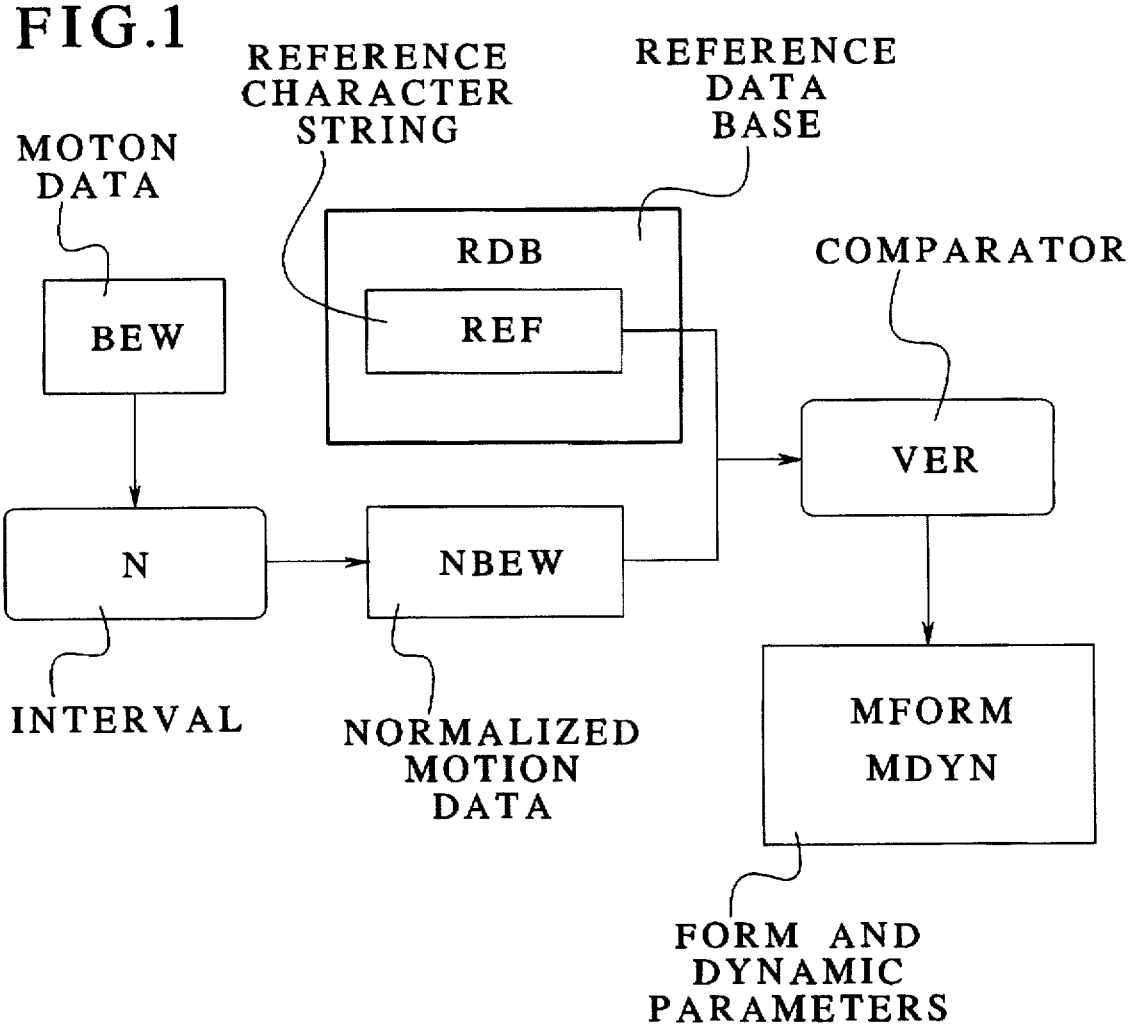
FIG. 1 shows an arrangement for determining the dynamic in the form of motion data.

In FIG. 1 an arrangement for handwriting verification is shown. The motion data BEW of a writing stylus are, for example, acquired via a tablet and are normalized in a further interval N, so that further normalized motion data NBEW are processed. These normalized motion data NBEW are compared with a reference sample or a reference character string REF, which is contained e.g. in a reference data base RDB, the comparison taking place in a comparator VER. By means of dynamic programming, through the comparison of the two character strings the verification measures for the agreement of the form parameters MFORM and the dynamic parameters MDYN are obtained.

Signature verification systems generally contain e.g. components for data recording, pre-processing, feature extraction and for the comparison process.

The input data are recorded by means of a sensor (tablet). They are normalized e.g. before or during the comparison with the sample. If a user inputs a character string together with his identification number, the character string produced is compared with his reference data. The identification number thereby serves e.g. for locating the correct reference set, acquired from the signals of one or several reference signatures.

A verification system must e.g. on the one hand allow for the variability within a class, while at the same time detecting significant differences between the classes (i.e. genuine vs. forgery). The method of determination of reference samples thus plays an important role. In the first place, the question arises of how the test sample is to be generated from the output data. This is to be done on the basis of the most characteristic/most discriminating features of a character string, independent of the specific approach employed.

If data from only one reference character string per person are allowed in the data base, genuine signatures that vary too much from this reference will be rejected along with forgeries. In the ideal case, for each subscriber the set would have to be determined by means of characteristic character strings, e.g. signatures, from a sufficiently large test set, and the validity of a signature produced at a later time would be verified by comparison with each of these reference signatures or a combination of them. The size of the reference set should here be e.g. adaptively determined according to the variability of the writer, and the reference set itself should be e.g. continually updated.

According to the output data used, a distinction is made between static signature verification (off-line method) and dynamic signature verification (on-line method).

The appearance of a character string can without doubt be reproduced with sufficient precision by an experienced forger. For this reason, the approach of dynamic signature verification is based on the interpretation of the signing process as a ballistic motion, i.e. a rapid motion without sensor-manipulator feedback, whose dynamic characteristics distinguishes the original from the forgery. Because of the unreproducible dynamic of the musculature, it is the dynamic characteristics that are most specific, sufficiently stable and reproducible for the signer. For a forger who knows only the appearance of the character string, these characteristics are not reproducible, or are reproducible only with difficulty.

Dynamic handwriting verification methods, e.g. signature verification methods, can be divided in principle into two classes, according to the choice of representation of the handwriting data: function-based and parameter-based approaches. According to the representational approach, specific possibilities are obtained for feature extraction or, respectively, feature processing and for comparison. Here parameter-based methods, with relatively low memory and computing requirements, are distinguished by weaker classification power, while function-based methods, with higher memory and computing requirements, are distinguished by significantly better certainty of verification.

In both cases, the output data are not directly comparable: the location of the beginning of a signature, for example, is not the same every time; signatures are of different sizes; the orientation of the writing with respect to the writing surface changes; the time needed for writing is variable. In order to ensure that recognition is independent of writing size, writing placement, degree of writing rotation, etc., the signals must be normalized before verification, or invariant verification methods must be used with respect to these characteristics.

Function-based methods work on functions as features. The complete signature signal is observed e.g. as a parametric or complex function of time, whose sample values form the features. The signals are thereby acquired directly via corresponding sensors or indirectly through calculation from the stylus data (e.g.: position: the sequence of the $(x(t),y(t))$ coordinates at discrete time points corresponding to the sampling rate of a pen tablet, sequence of the stylus liftings/lowerings; pressure: the sequence of the p(t) signals; force: the motor force used during the writing process; speed: the sequence of the v(t) signals, etc.).

Handwriting verification is thus traceable to the comparison of functions. Standard approaches to this can be found in the literature. In particular, recourse can be had to experience with such approaches in the field of speech processing.

Figure 2:
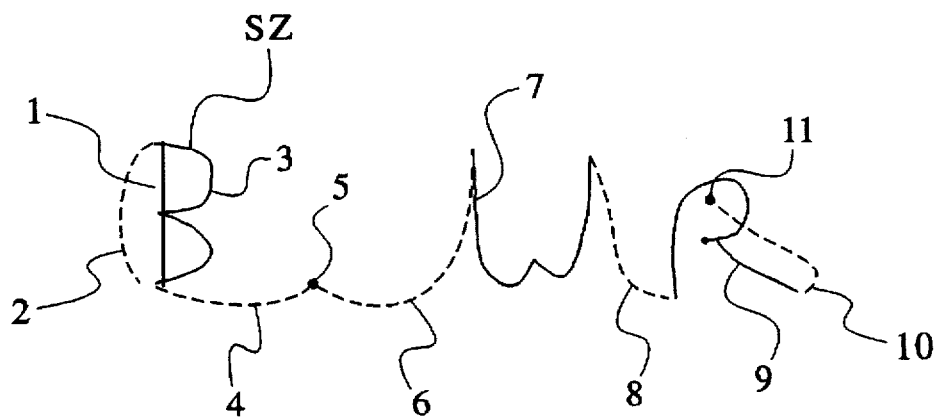
FIG. 2 shows a character string divided into strokes.

FIG. 2 shows a character string SZ to be verified. This character string represents e.g. a signature and is divided into individual strokes 1 to 11. Here it should be noted that the strokes can be divided into two subclasses: the near-strokes, i.e. strokes that are not written, and the writing strokes, i.e. strokes in which the stylus touches the paper or the writing surface. The near-strokes are represented in FIG. 2 by broken lines, and are numbered below the character string SZ with the numbers 2, 4, 6, 8, 10. The writing strokes are represented by solid lines and marked with odd numbers. Through the acquisition of strokes and the comparison of these strokes by the method according to the invention, the advantage is realized that each character string produced can be divided into different partial sections, which can subsequently be compared with corresponding partial character strings of the reference character suing. In this way error is reduced in dynamic programming in the locus allocation of the individual points as regards the individually acquired motion parameters of the character strings to be compared.

The method according to the invention is based on the non-linear correlation of time functions and is an improvement of the method of Sato & Kogure—Y. Sato, Kogure, Online Signature Verification Based on Shape, Motion, and Writing Pressure, Proc. 6th Int. Conf. On Pattern Recognition, Vol. 2, 1982, pp. 823–826. This system, based on normalizing and time warping of position signals in connection with corresponding pressure signals, is one of the most successful in the literature with respect to its performance in recognition (even for "masterful" forgeries).

The stylus data, obtained e.g. by means of a WACOM tablet (PL-100V), yield information about stylus liftings and lowerings, temporal position and pressure signals and a sequence of sampling time points. These data are acquired, independent of whether this takes place in the vicinity of or on the tablet.

FIG. 2 further shows the position signal curve for a signature. The output signal of length n, having e.g. the form $$[\text{PenUp/PenDown}, x(t), y(t), p(t), t] \quad (1)$$

is normalized before further processing (verification or reference formation) with respect to time, position (translation and rotation in the tablet plane) and size, in a way similar to the method of Sato & Kogure, supra. It should be noted that here the horizontal writing motion contained in the x(t) signals must be eliminated, so that the time warping can also be applied to these signals.

For verification, stylus signals of different lengths are now non-linearly compared by means of dynamic time warping—the non-linear correlation of two time signals through the use of dynamic programming (DP). Let $$A = a_1, a_2, \ldots, a_i, \ldots, a_I \quad (2)$$

and $$B = b_1, b_2, \ldots, b_j, \ldots, b_J$$

be two time signals (signature signals) of different lengths. Then the sought after non-linear correlation of these signals is a sequence of index pairs of the form $$W = (w(1), w(2), \ldots, w(K)), \quad (3)$$

with $$w(1)=(1,1), w(k)=(i(k),j(k)), w(K)=(I,J), \quad (4)$$

K length of the warp path. W implements a mapping of the time axis of the one signal onto that of the other signal and is thus designated as a warping function. If no time differences existed between the two signals, W would be the diagonal between the points (1,1) and (I,J). Let the local distance between two feature vectors $a_i$ and b to the time points i or, respectively, j be $$d(W)=d(a_i, b_j)=d(i,j)=\|a_i-b_j\|, \quad (5)$$

(Euclidean distance or absolute difference); then $$D(A,B) = \min_W \left[ \frac{\sum_{k=1}^{K} d(w(k)) * c(k)}{\sum_{k=1}^{K} c(k)} \right], \text{ with} \quad (6)$$

c(k) positive weighting function of the local distance $$d(w(k))=d(a_i,b_j) \quad (7)$$

and $$\sum_{k=1}^{K} c(k)$$

normalization for the length of the warp path, is the global minimal time-normalized distance between the two signals A and B. Under the assumption that the weighting functions c(k) are independent of the warp function W, we have:

$$D(A,B) = \frac{1}{\sum_{k=1}^{K} c(k)} \min_W \left[ \sum_{k=1}^{K} d(w(k))^* c(k) \right] = \quad (8)$$

$$\frac{1}{N} \min_W \left[ \sum_{k=1}^{K} d(w(k))^* c(k) \right]$$

The structural characteristics of temporal signature signals lead to the following global conditions on the warping function W:

$$\text{Monotonicity: } i(k-1) \leq i(k) \text{ and } j(k-1) \leq j(k) \quad (9)$$

$$\text{Continuity: } i(k)-i(k-1) \leq 1 \text{ and } j(k)-j(k-1) \leq 1 \quad (10)$$

and thereby $$w(k-1) = \begin{cases} i(k), j(k) - 1 \\ i(k) - 1, j(k) - 1 \\ i(k) - 1, j(k) \end{cases} \quad (11)$$

In contrast to the case of speech recognition, in signature recognition a pseudo-asymmetrical form ($D(A,B) \neq D(B,A)$) of the weighting factors should preferably be used. It thereby results that:

$$c(k)=1 \text{ for all } k=1 \ldots K \quad (12)$$

$$N=I \quad (13)$$

and thereby as the central DP equation (without slope limit):

$$g(i,j) = \min \begin{bmatrix} g(i,j-1) + d(i,j) \\ g(i-1,j-1) + d(i,j) \\ g(i-1,j) + d(i,j) \end{bmatrix} = d(i,j) + \quad (14)$$

$$\min \begin{bmatrix} g(i,j-1) \\ g(i-1,j-1) \\ g(i-1,j) \end{bmatrix}$$

and with the overall measure for the allocation of A and B $$D(A,B)=(1/N)g(I,J). \quad (15)$$

Figure 3:
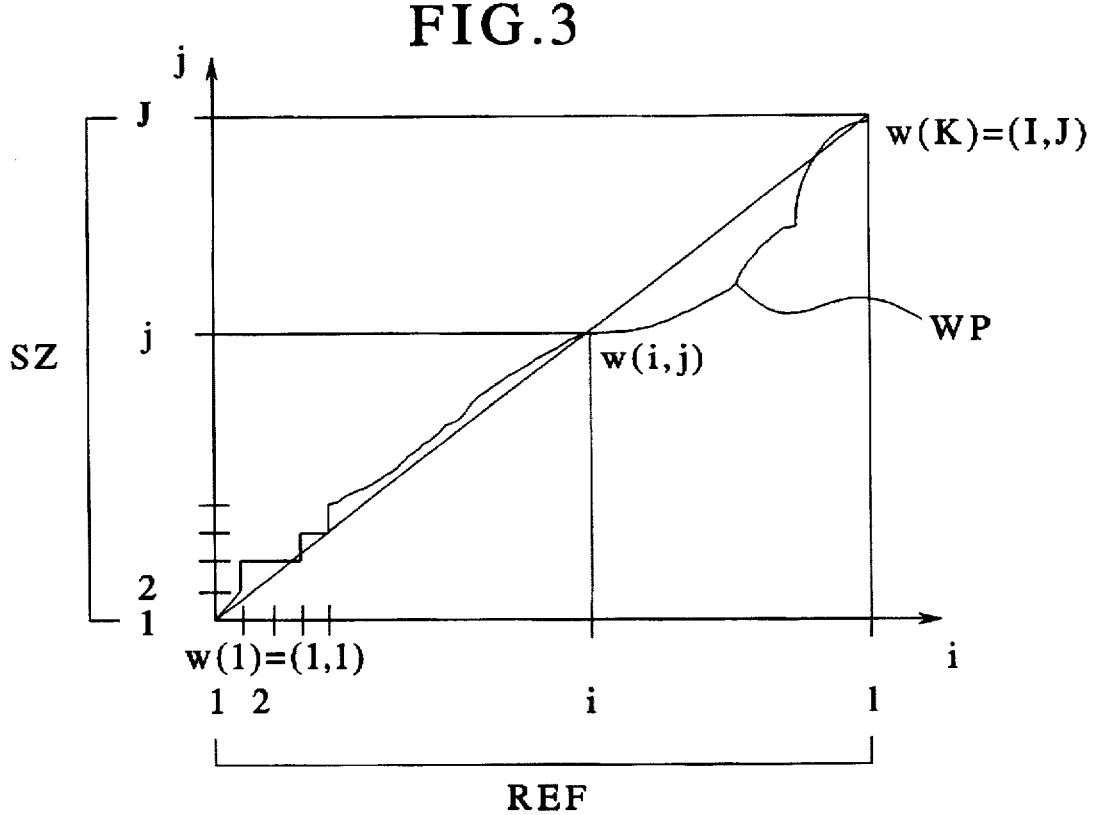
FIG. 3 shows the principle of dynamic programming by means of an example.

FIG. 3 illustrates the comparison result obtained with the method of dynamic programming by means of a reference character string and an autograph character string. The warp function WP obtained by means of dynamic programming describes the distortion of the character string SZ relative to the reference character string REF. The method guarantees the optimization of this allocation relative to the parameters of SZ and REF used in the cost functions. In the case where SZ=REF, WP would correspond to the diagonals in the represented rectangle, extending from W(1)=(1.1) to W(K) =(I,J). By means of the curve of WP, a measure is obtained for the motion agreement of the character string SZ with the reference character string REF. This is essentially achieved in that it is attempted to bring characteristic points of the reference character string into coincidence with characteristic points of the produced character string by bringing the corresponding time segments and the allocated locus coordinates of the character strings into the most optimal possible coincidence with one another. Normally, the character strings are acquired during their production via a digitizing tablet, so that determinate locus coordinates of the produced signature are acquired in time segments. In FIG. 3, the curve that leads to minimal distances in the comparison of the individual locus parameters of the reference character string and of the autograph character string is now plotted as the warp path.

Matching by means of dynamic programming has the decisive advantage that the non-linear time transformation automatically generates, alongside the best mapping between the sample and the reference, a measure for the quality of this best mapping, D(A,B). Let:

R(t)=a given reference signature (16)

P(t)=a character string to be verified (17)

RN(t)=the normalized reference signature (16)

PN(t)=the normalized character string (17)

Then the measure for the quality of the form of the character string is $$M_{Form}=D(RN,PN) \quad (18)$$

and the measure for the quality in the motion (corresponding to [2]) is $$M_{Bewegung}=\|W(t)-t\| \quad (19)$$

where w(t) is the optimal time axis transformation of the sample PN relative to the reference RN, and t is the ideal diagonal relative to the sampling points of the reference. $M_{Bewegung}$ corresponds to the surface enclosed by the functions w(t) and t.

The assembled evaluation measure for the agreement between the reference and the sample thus results as the pseudo-Mahalanobis distance to:

$$M_{RP}=(M_{Form}, M_{Bewegung})=\Sigma^{-1}(M_{Form}, M_{Bewegung})^\tau \quad (20)$$

whereby $$\Sigma := \begin{bmatrix} \text{std\_Form}^3 & 0 \\ 0 & \text{std\_Bewegung}^2 \end{bmatrix} \quad (21)$$

std_Form the standard deviation of the form measure over an initial set of reference character strings (22)

std_Bewegung the standard deviation of the motion measure over an initial set of reference character strings (23)

Experimental trials with the method according to the invention have shown that the above selection of $\Sigma$ displays better discrimination characteristics between originals and forgeries than the selection in Sato and Kogure, supra, with $\Sigma$=the covariance matrix of the reference character strings.

With the above equations, a method is obtained by which complete signature signals can be directly non-linearly compared. The following considerations thereby lead to the method according to the invention.

A comparison of the complete reference character string with the complete autograph character string leads not only to a higher computing expenditure, but also in particular to worsened performance in verification. Structural units of a signature signal are the strokes, the succession of feature vectors acquired during a closed line movement on the tablet (PenDown strokes) or in the vicinity of the tablet (PenUp or near strokes), or of a comparable suitable input means, such as a video camera or a joystick. If the complete signature signals are compared, the stroke information is lost, which information is in itself a global identifying feature of the signature, and the warp function is allowed to abandon the existing stroke boundaries on the basis of the local costs. In this case, the motion measure for the signature verification in particular is hardly usable.

The method according to the invention thus operates on strokes as structural units. The near strokes, not visible in the signature image, are, as carriers of dynamic information not derivable from the signature image, treated in the same way as the visible strokes. In the method according to the invention, the motion measure is a powerful discriminator between originals and forgeries.

Sato & Kogure, supra, generate, alongside the form measure (from the warp of the position values) and the motion measure, a pressure measure by means of an independent warp of the pressure values, and the three measures are then combined into one measure. The dependence of the dynamic on the locus at which it is produced is lost along with local information. The method according to the invention thus uses only a distance function, in which dynamic parameters and form parameters are locally combined.

Experimental trials have shown that there are "more stable" and "less stable" strokes, i.e. there are segments that are characterized by greater or lesser intrapersonal variability. The method according to the invention takes this fact into account by weighting them correspondingly, according to their reliability.

Figure 4:
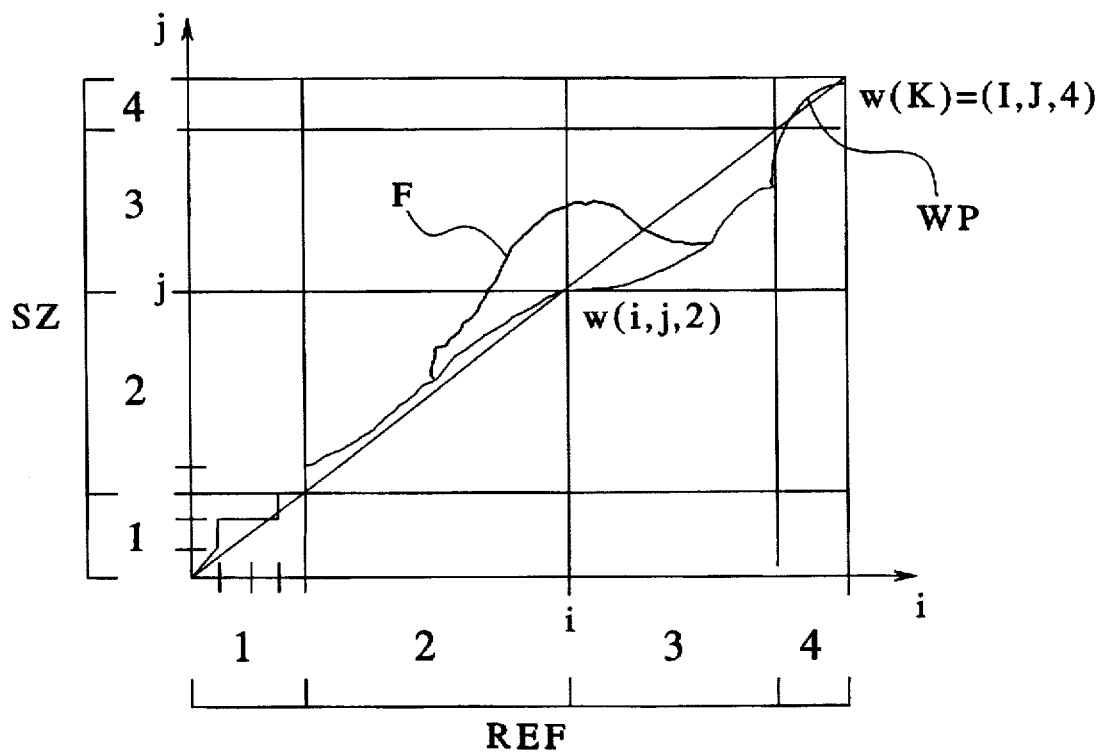
FIG. 4 illustrates the stroke-based approach to handwriting verification.

FIG. 4 illustrates the method according to the invention for handwriting verification on the basis of a sample. The reference designations are chosen as in FIG. 3. In addition, in FIG. 4 the stroke boundaries of the reference character string and of the autograph character string are plotted according to the invention. They are designated by 1 to 4. On the basis of the rectangle formed, it can be seen that the individual strokes are not of the same length. In FIG. 4, F indicates a faulty stroke allocation in the curve, which was subsequently additionally inserted into the curve. Here a locus coordinate or a motion parameter from stroke 3 of the character string SZ to be compared is allocated to stroke 2 of the reference character string. However, due to the stroke-bound writing sequence, this cannot be, but this is not taken into account in the form by the prior art, since the prior art does not also evaluate the stroke information. As can be further seen in FIG. 4, the warp function is now formed in a spatial region; this is recognizable at the coordinates W(K)=(i,j,4). This step of the comparison is required in case the number of strokes in the reference character string is not identical to that in the produced character string. Verification must thus take place according to certain syntactical rules, which take into account that the signature is produced in dependence on time and that the strokes are brought successively onto paper. In the formation of the warp function, the minimal distance between neighboring strokes, and not only between equal strokes of the sample and of the reference character string, must for example now thus also be formed.

Thus, let:

$RN(t)=(zr(t), pr(t), vxr(t))$ the feature vectors of the normalized reference character string (24)

$PN(t)=(zp(t), pp(t), vxp(t))$ the feature vectors of the normalized autograph character string (25)

$R(t)=(rs_1; \ldots; rs_k)$ the stroke sequence in the reference character string (26)

$P(t)=(ps_1; \ldots; ps_m)$ the stroke sequence in the autograph character string (with m=K at first) (27)

mean_Form_$s_i$ the mean value of the form measure of stroke i over an initial set of reference character strings (28)

mean_Bewegung_$s_i$ the mean value of the motion measure of stroke i over an initial set of reference character strings (29)

std_Form_$s_i$ the standard deviation of the form measure of stroke I over an initial set of reference character strings (30)

std_Bewegung_$s_i$ the standard deviation of the motion measure of stroke I over an initial set of reference character strings (31)

Then the following holds for the stroke-based form and motion measures:

$$M_{Form} = \sum_{i=1}^{n} wsi * D(rsi,psi), \text{ with} \qquad (32)$$

$$wsi = \frac{1}{\text{mean\_Form\_}si * \text{std\_Form\_}si} \qquad (33)$$

or, alternatively, $$M_{Form} = \sum_{i=1}^{n} wsi * D^2(rsi,psi), \text{ with} \qquad (32')$$

$$wsi = \frac{1}{\text{std\_Form\_}si^2} \text{ and} \qquad (33')$$

$$M_{Bewegung} = \sum_{i=1}^{n} M_{Bewegung}(rsi,psi) \qquad (34)$$

$ws_i$ rewards in particular strokes having stable small evaluation measures.

The above system according to the invention with m=K would presuppose that the reference character string and the autograph character string (test sample) always have the same number of strokes in the correct sequence, i.e. the sequence corresponding to the reference character string. However, for forgeries in particular this is not the case. Experiments have shown that even in expert forgeries it happens time and again that a small detail present in the original—a dot over an I, for example—is missing in the forgery, or that a stroke that is continuous for the original writer falls into several strokes for the forger, if the stylus is intermittently lifted from the tablet and then lowered again. However, missing or superfluous strokes are not blindly penalized, since the original writer also produces them, particularly the omission of small details. If such original signatures are thus not to be excessively and sweepingly penalized on the basis of a missing or additional stroke, and at the same time forgeries are to receive appropriate evaluation, the verification method must be in a position to recognize missing or additional strokes in relation to the reference as such and to penalize them according to their "importance," while still correctly classifying strokes that are present and evaluating them according to the above stroke-based method according to the invention.

The problem resembles, with stricter boundary conditions, the problem of fluent speech recognition by means of DPM from a known word alphabet. Methods are known from Ney, supra, by which, after the introduction of a third warp index k=1 . . . K with K=number of possible words, with the one optimal warp path W=((i,j,k)) the individual word boundaries, the classification of the individual words and the recognition of the overall sentence are simultaneously achieved. For this purpose, in the distance function so-called "word-internal" and "inter-word" rules are introduced. Syntactic boundary conditions for word sequences are defined for each word of the alphabet by means of so-called "precursor sets." Against this background, the DP equation according to the invention results as an expansion of formula (14) to:

$$g(i,j,k) = \qquad (35)$$

$$d(i,j,k) + \min \begin{bmatrix} g(i,j-1,k) \\ g(i-1,j-1,k) \\ g(i-1,j,k) \end{bmatrix}, \text{ for } i = 2 \ldots I(K), j = 2 \ldots J(K)$$

as calculating rule within the stroke k, k=1 ... K, and $$g(i,1,k) = (di,1,k) + \min \begin{bmatrix} g(i-1,1,k) \\ g(i-1,j(k^*),k^*) \end{bmatrix}, k^* \in Pre(k), \qquad (36)$$

for I=2 ... I(K), j=2 ... J(K) as calculating rule at the stroke boundaries, with Pre(k) the possible set of allowable precursor strokes to stroke k. (37)

and with $d(i,j,k) = w_1 \cdot d_1(i,j,k) + w_2 \cdot d_2(i,j,k)$

Furthermore, let Pre(k) be defined over the state transitions of a finite automaton having states $\{rs_1; \ldots; rs_k\}$. The verification method according to the invention should thereby fulfill, for example, the following syntactic boundary conditions:

Each reference stroke may be used only once.

Arbitrary stroke combinations are not allowed, since the original signer's typical way of signing is given by the sequence order of the reference strokes, i.e. a stroke used once can no longer appear in a precursor set.

A missing stroke in comparison to the reference means, during left-to-right processing of the signature signals, that the stroke matching the sample stroke is located two strokes further to the right at the earliest, since with each visible stroke a near stroke is also missing. In this case, we limit the method to a single visible stroke missing in a region—if more strokes are missing as the sequence progresses, the test sample is classified as a forgery by the method according to the invention.

The total number of missing or superfluous strokes is not to be globally limited, but rather goes into the summation only through the corresponding penalization evaluation measures.

Strokes that are superfluous in comparison to the reference are penalized through comparison with a pseudo-stroke of a length corresponding to that of the sample stroke.

Strokes that are missing in comparison to the reference are penalized corresponding to the missing reference stroke.

The stroke boundaries are given in the case of signature verification, which simplifies implementation.

It thereby results that:

$$Pre(k) = \{k-1; k-3; kNull; kPseudo\}, \qquad (38)$$

k=1 ... K stroke index in the reference, kNull index of the "missing strokes," kPseudo index of the "superfluous strokes."

$$Pre(1) = \{kNull; kPseudo\} \qquad (39)$$

This method with (35) and (36) as central DP equations computes the three-dimensional warp path ((i,j,k)) but has the disadvantage that for the decision of the stroke boundaries the local measures for all the allowed precursor strokes must be known. In the specific case of signature verification, this is unnecessary and inefficient: originals and (good) forgeries display in the normal case "almost" the same stroke structure as the respective reference. Only small deviations such as omissions appear in a few places. Evaluations for alternative precursor strokes are thus preferably calculated in the method according to the invention only as required. This is the case if for example the evaluation measure m_Form_s calculated for a stroke pair deviates too strongly from the mean value mean_Form_$s_i$ that holds for the corresponding reference stroke. i.e. if:

$$m\_Form\_s \geq mean\_Form\_s_i = alpha\_test \cdot std\_Form\_s_i, \qquad (40)$$

with alpha_test: weighting constant for the standard deviation in the test (41)

For this decision, preferably only the form measure should be brought to bear, since the motion measure is too variable for forgeries. If this were also used, the evaluations for alternative precursor strokes would again be calculated unnecessarily often.

The evaluations for the rest of the possible precursor strokes are preferably calculated only when (40) is satisfied. The decision of the stroke allocation then falls on the k* ΣPre(k), with minimal evaluation m_Form. The individual evaluation measures m_Form and m_Bewegung, determined thereby for the individual strokes, are again summed up according to the equations (32) and (34).

Thereby, in evaluating a detected missing stroke (null stroke), such a stroke is entered into the overall evaluations with a high value relative to the corresponding reference stroke, i.e.:

$$m\_Form\_s_i = mean\_Form\_s_i + alpha\_weight \cdot std\_Form\_s_i, \quad (b\ 42)$$

and $$m\_Bewegung\_s_i = mean\_Bewegung\_s_i + alpha\_weight \cdot std\_Bewegung\_s_i, \qquad (43)$$

with alpha_weight weighting constant for the standard deviation in the calculation of the evaluations. (44)

Superfluous strokes, i.e. those not present in the reference sample, are preferably, for example, multiplied by the evaluation of a "pseudostroke" of length 1, with their actual stroke length rated:

len the length of the superfluous stroke (45)

len_ref the overall length of the reference (46)

$$form\_pseudo = (sum(mean\_Form\_s_i + alpha\_weight \cdot std\_Form\_s_i)/len\_ref \qquad (47)$$

bewegung_pseudo=(sum(mean_Bewegung_s$_i$+alpha_
    weight*std_Bewegung_s$_i$)/len_ref         (48)

with I=1, . . . ,K m_Form_s=len*form_pseudo                       (49)

m_Bewegung_s=len*bewegung_pseudo               (50)

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for dynamic verification of an autograph character string based on a reference autograph character string, comprising the steps of:

during handwriting of the autograph character string and the reference autograph character string with a stylus, acquiring and retaining characteristic motion parameters that describe stylus motion;

on the basis of the motion parameters, and in dependence on whether or not the stylus is pressed against a writing surface, decomposing each of the autograph character string and the reference autograph character string into at least a first and a second partial character string in the form of a first and a second stroke;

normalizing the motion parameters of the reference character string and of the autograph character string;

applying at least one predefined rule, which determines allocation or evaluation of strokes to be compared to the autograph character string and to the reference character string; and comparing the strokes of the autograph character string with allocated strokes of the reference character string by dynamic programming, whereby during calculation of a minimal distance between the respective strokes, a combination of at least two normalized motion parameters is selected, of which a first describes at least stylus position in dependence on time so that, strokewise, a verification measure is obtained that indicates similarity of the autograph character string to the reference character string.

2. The method according to claim 1 wherein the predefined rule determines both allocation and evaluation of strokes to be compared.

3. The method according to claim 1, wherein two types of strokes are used, one type of stroke describing motion of the stylus on the writing surface and the other type of stroke describing motions of the stylus lifted from the writing surface.

4. The method according to claim 1 wherein at least one of the motion parameters to be combined in the step of applying the at least one predefined rule is multiplicatively weighted with a weighting factor.

5. The method according to claim 1 wherein at least one of the motion parameters to be combined in the step of applying the at least one predefined rule is pressure used in writing.

6. The method according to claim 1 wherein at least one of the motion parameters to be combined in the step of applying the at least one predefined rule is writing speed.

7. The method according to claim 1 wherein, as a rule of evaluation for a countable reference set of reference character strings, it is examined with what degree of precision the motion parameters are reproduced in relation to individual strokes regarded over the set, and in which a weighting factor is assigned per stroke in dependence on accuracy of reproduction in such a manner that strokes having great reproductive accuracy are strongly weighted and strokes having little reproductive accuracy are weakly weighted, so that the verification measure depends more strongly on reproducible motion parameters.

8. The method according to claim 7 wherein a square of the verification measure is divided by a square of a standard deviation of the stroke being examined relative to the reference set.

9. The method according to claim 7 in which the verification measure is divided by a standard deviation of the stroke being examined relative to the reference set multiplied by a mean value of the verification measure formed with corresponding strokes within the reference set.

10. The method according to claim 1 in which as an allocation role it is tested whether a number of strokes in the reference character string agrees with a number of strokes of the autograph character string, and wherein, if this is not the case, syntactic rules for stroke comparison are applied which take into account at least a temporal sequence of strokes during handwriting.

11. The method according to claim 10 in which as a syntactical role each stroke of the reference character string is used only once.

12. The method according to claim 1, in which as an evaluation role a superfluous stroke worsens the verification measure in dependence on its stroke length.

13. The method according to claim 1, in which the following holds:

$$M_{Form} = \sum_{i=1}^{n} wsi * D(rsi,psi), \text{ with}$$

$$wsi = \frac{1}{\text{mean\_Form\_si} * \text{std\_Form\_si}}, \text{ and}$$

$$M_{Bewegung} = \sum_{i=1}^{n} M_{Bewegung}(rsi,psi)$$

$$g(i,j,k) = d(i,j,k) + \min \begin{bmatrix} g(i,j-1,k) \\ g(i-1,j-1,k) \\ g(i-1,j,k) \end{bmatrix},$$

for I=2 . . . I(K), j=2 . . . J(K) as a calculating rule for the verification measure within the stroke k, k=1 . . . K, and $$g(i,1,k) = d(i,1,k) + \min \begin{bmatrix} g(i-1,1,k) \\ g(i-1,j(k^*),k^*) \end{bmatrix}, k^* \in Pre(k),$$

for I=2 . . . I(K), j=2 . . . J(K) as a calculating rule for the verification measure at the stroke borders with:

d(i,j,K)=w$_1$·d$_1$(i,j,k)+w$_2$·d$_2$(i,j,k)

R(t)=[PenUp/PenDown, x(t), y(t), p(t), t] general feature vector x,y locus parameter, p pressure parameter, t time RN(t)=(zr(t), pr(t), vxr(t)) feature vectors of a normalized reference character string PN(t)=(zp(t), pp(t), vxp(t)) feature vectors of a normalized autograph character string z(t) x(t)+I*y(t);

vx(t) speed in x direction $R(t)=(rs_1; \ldots ; rs_k)$ stroke sequence in the reference character string $P(t)=(ps_1; \ldots ; ps_m)$ the stroke sequence in the autograph character string (with m=K at first))

$M_{form}$ Verification measure for agreement of form-determining motion parameters $M_{bewegung}$ Verification measure for agreement of motion parameters mean_Form_s$_i$ a mean value of a form measure of stroke I over an initial set of reference character strings mean_Bewegung_s$_i$ a mean value of a motion measure of stroke I over an initial set of reference character strings std_Form_s$_i$ standard deviation of a form measure of stroke I over an initial set of reference character strings std_Bewegung_s$_i$ standard deviation of the motion measure of stroke I over an initial set of reference character strings $w_1$ weighting factor derived at least from std_Form_si $w_2$ weighting factor derived at least from std_Bewegung_s$_i$ Pre(k) possible set of allowable precursor strokes to stroke k Pre(k)={k−1;k−3; kNull; kPseudo}, k=1 . . . K stroke index in the reference character string kNull index of "missing strokes"

kPseudo index of "superfluous strokes"

(Pre(1)={kNull; kPseudo}.

14. The method according to claim 13, in which it is a rule that where a following condition is met, evaluations for the rest of the possible precursor strokes are also calculated:

m_Form_s>=mean_Form_s$_i$+alpha*std_Form_s$_i$ with:

alpha weighting constant for a standard deviation where a decision of stroke allocation then falls to the k*ŒPre(k), with minimal evaluation m_Form, and wherein individual evaluation measures m_Form and m_Bewegung, determined for individual strokes, are summed up as follows:

m_Form_s=mean_Form_s$_i$+alpha_weight*std_Form_S$_i$, and m_Bewegung_s=mean_Bewegung_s$_i$+alpha_weight*std_Bewegung_s$_i$, with:

alpha_weight weighting constant for a standard deviation during the calculation of the evaluations.

15. The method according to claim 13, with the following additional conditions as a role for superfluous strokes, i.e. strokes:

form_pseudo=(sum(mean_Form_s$_i$+alpha_weight*std_Form_s$_i$)/len_ref bewegung_pseudo=(sum(mean_Bewegung_s$_i$+alpha_weight*std_Bewegung_s$_i$)/len_ref with I=1, . . . .K m_Form_s=len*form_pseudo m_Bewegung_s=len*bewegung_pseudo len_ref the overall length of the reference character string len the length of the superfluous stroke.

16. The method according to claim 15 wherein the superfluous strokes are strokes not present in the reference autograph character string.

* * * * *